United States Patent

Camacho et al.

[11] 4,042,882
[45] Aug. 16, 1977

[54] RADIO-BALLOON DISTRESS SIGNAL

[76] Inventors: Gustavo G. Camacho, 308 E. Broadway; Edward J. Shackleford, 125 E. Victory, both of Phoenix, Ariz. 85040

[21] Appl. No.: 733,438

[22] Filed: Oct. 18, 1976

[51] Int. Cl.² .......................... H04B 1/04; H04B 1/38
[52] U.S. Cl. ................................. 325/118; 116/124 B
[58] Field of Search .................... 116/124 B; 340/224; 40/214; 46/88, 90; 244/98; 325/112, 114, 118

[56] References Cited

U.S. PATENT DOCUMENTS

| | | | |
|---|---|---|---|
| 2,758,804 | 8/1956 | Hakomaki | 244/98 X |
| 2,831,967 | 4/1958 | Bayze | 116/124 B X |
| 2,923,917 | 2/1960 | McPherson et al. | 116/124 B X |
| 3,002,490 | 10/1961 | Murray | 116/124 B |
| 3,112,447 | 11/1963 | Davis | 325/112 X |
| 3,530,451 | 9/1970 | Devine | 340/224 X |
| 3,746,285 | 7/1973 | Mango | 116/124 B |
| 3,881,531 | 5/1975 | Rossi | 46/90 X |
| 3,964,427 | 6/1976 | Murphy | 116/DIG. 9 X |

Primary Examiner—Richard C. Queisser
Assistant Examiner—Daniel M. Yasich
Attorney, Agent, or Firm—John A. Robertson

[57] ABSTRACT

A signal for indicating the location of one or more people in distress comprising a rectangular tank containing helium, an inflatable balloon enclosed by a casing of aluminum foil and tubular connections between the tank and the balloon and which include valves. A radio transmitter is connected to the balloon by a short cable and a nylon cord which functions as a tether is connected to the transmitter. The other end of this tether is taken up on a reel. A trigger on the transmitter is tripped when the tether is payed out a predetermined distance to activate the transmitter. The balloon, the transmitter, and the reel are all mounted on the top of the tank together with a first aid survival kit and a cover which is hinged at one end to the tank encloses these elements. A clip is provided for securing the entire unit to the person of a user.

8 Claims, 6 Drawing Figures

RADIO-BALLOON DISTRESS SIGNAL

The present invention relates to distress signals for people in isolated areas and is concerned primarily with such a signal which includes a balloon having a radio transmitter closely adjacent to the balloon and which is activated when a tether is payed off of a reel a predetermined distance.

BACKGROUND OF THE INVENTION

At the present time many people find themselves in distressed circumstances such as by becoming lost or accidents of either land vehicles or aircraft. In many instances, the site of the misfortune will be in areas that are heavily wooded or include hills, valleys and even mountains. The desirability of providing a signal which identifies the location of the distressed person has long been recognized and much effort has been directed to the provision of apparatus for identifying this location.

Normally all of the devices of this nature are characterized as including a balloon which initially is packed in a compact condition in a case and which is inflated by a lighter than air gas which is contained in a cartridge or similar container in the case. A tether extends from the balloon and is taken up in coil form within the casing. Upon actuation of a valve or similar device, the balloon is inflated by the gas and rises to a height determined by the length of the tether. It is also known to include a radio transmitter in the case.

The known devices of the character aforesaid have one serious shortcoming. If the area in which the person requiring help is hilly and/or is covered by tall trees, two possibly unsatisfactory conditions are present. In the first instance, the balloon in ascending may become caught in the branches of trees and fail to reach a height at which it can be seen from an appreciable distance. The hilly terrain also may prevent the balloon from being viewed from a substantial distance. Then again, with the radio transmitter being closely adjacent to the ground surface, its transmitting range is limited.

Known products of this type also include certain undesirable features which may be considered as minor as compared to those above noted, but which nevertheless, are of practical importance. Thus, the known methods of packing the balloon in a collapsed condition in the casing are not completely satisfactory. Also, the manner of securing the container in sealed condition and providing for its being opened to initiate the flow of gas to the balloon is at times, unreliable. It is further noted that many of the apparatuses of this type do not include survival kits which contain materials necessary to preserve the health and life of a person for any appreciable period.

OBJECTS OF THE INVENTION

With the foregoing conditions in mind, the presnet invention has in view the following objectives;

1. To provide a distress signal which includes as characteristic and essential elements, a container of a lighter than air gas, an inflatable balloon connected to the container by a conduit arrangement including a breakable connection and valves, one of which seals the gas container but which may be opened to permit gas to flow into the balloon, and the other of which is a one way check valve which permits gas to flow into the balloon but prevents its escape therefrom. A radio transmitter is connected to the balloon by a short cable and a tether extends from the transmitter to a reel on the tank.

2. To provide in a distress signal of the type noted, an aluminum foil casing which encloses the balloon in a deflated compact condition and which is ruptured by inflation of the balloon.

3. To provide in a distress signal of the character aforesaid, a gas tank having a neck extending therefrom and including a valve which normally closes the neck and is held in this position by a lock pin and which is biased into open position by a spring when the lock pin is removed.

4. To provide in a distress signal of the kind described, a balloon having a neck which includes a one way valve and which is connected to the neck on the tank by breakable connections.

5. To provide in a distress signal of the type noted, a short cable, one end of which is connected to the neck on the balloon and the other end to the radio transmitter.

6. To provide in a distress signal of the character aforesaid, a tether having one end connected to the transmitter and its other end being secured to the reel on which it is taken up. The connection to the transmitter to the tank includes a trigger which, when the transmitter leaves the tank, activates the transmitter.

7. To provide a distress signal of the character aforesaid having a survival kit which is mounted on the tank.

8. To provide in a distress signal of the kind described, a cover which is secured to the tank and which encloses the balloon, the transmitter, the reel and the survival kit.

Various other more detailed objects and advantages of the invention, such as arise in connection with carrying out the above ideas in a practical embodiment will, in part, become apparent and, in part, be hereinafter stated as the description of the invention proceeds.

SUMMARY OF THE INVENTION

The foregoing objects are achieved by providing a distress signal in the form of a unit which includes as a base a rectangular gas-tight tank having opposed end and side walls. A neck projects from one end wall and mounted therein is a valve which is held in closed position by a lock pin which passes through aligned openings in the neck and a valve stem. An expansion coil spring biases the valve to open position and is effective to do so when the lock pin is removed. A conduit extends laterally from one side of the neck.

A conventional balloon is folded into a compact condition when deflated and is enclosed by a casing of aluminum foil. This balloon package is positioned on the tank immediately above the end from which the aforesaid neck projects. The balloon has a neck including a one way check valve which permits the introduction of gas into the balloon but prevents its escape therefrom. From one end of this neck a conduit section extends which overlaps the lateral extending conduit on the neck of the tank. These overlapping conduits constitute a connection which is broken when inflation of the balloon exerts sufficient force to pull the conduit sections apart.

A radio transmitter is positioned on the tank next to the balloon and at one side of the tank and is held thereon by clamps. A short length of cable has one end anchored to the neck of the balloon and its other end to one end of the transmitter.

A reel is also positioned on the top wall of the tank behind the balloon package and at one side of the transmitter. A tether in the form of a nylon cord is taken up on this reel and its other end is secured to the transmitter. Thus, when the transmitter breaks free of the clamps, the trigger activates the transmitter.

A survival kit is mounted on the top wall of the tank next to the transmitter and reel. It includes various elements and materials which are necessary to maintain the health and provide for the survival of a person in the particular geographical areas where the user of the signal may expect to find himself. As an example, the survival kit may include matches or a lighter, compresses, bandages, a plastic poncho, metallic splints, rubber tourniquets, and foods in concentrated form.

A cover of substantially the same size and shape as the tank has an end wall the lower edge of which is hinged to an upper edge of the end wall of the tank remote from that carrying the neck. The cover has side walls that depend from a top wall and which overlie the survival kit, transmitter, reel, and balloon package. It also has a front end wall which may be secured to the tank by conventional snap fasteners and is formed with a recess which accommodates the balloon neck.

The tank has a bottom wall which is provided with a clip which may be used in securing the unit to the person of a user such as by encompassing a belt worn by the user.

The operation is believed to be obvious from the above description of the parts of the signal. A person finding himself in distress, pulls the lock pin, the gas, which ordinarily will be helium, flows from the tank through the neck, through the lateral conduit sections and past the one way check valve in the neck and into the balloon. When this gas exerts sufficient pressure, the foil case is ruptured and the balloon expands. As it rises, it pulls the transmitter away from the tank and the trigger activates the transmitter to broadcast the necessary SOS or its equivalent.

For a full and more complete understanding of the invention, reference may be had to the following description and accompanying drawings wherein.

DESCRIPTION OF THE PREFERRED EMBODIMENT

Figure 1:
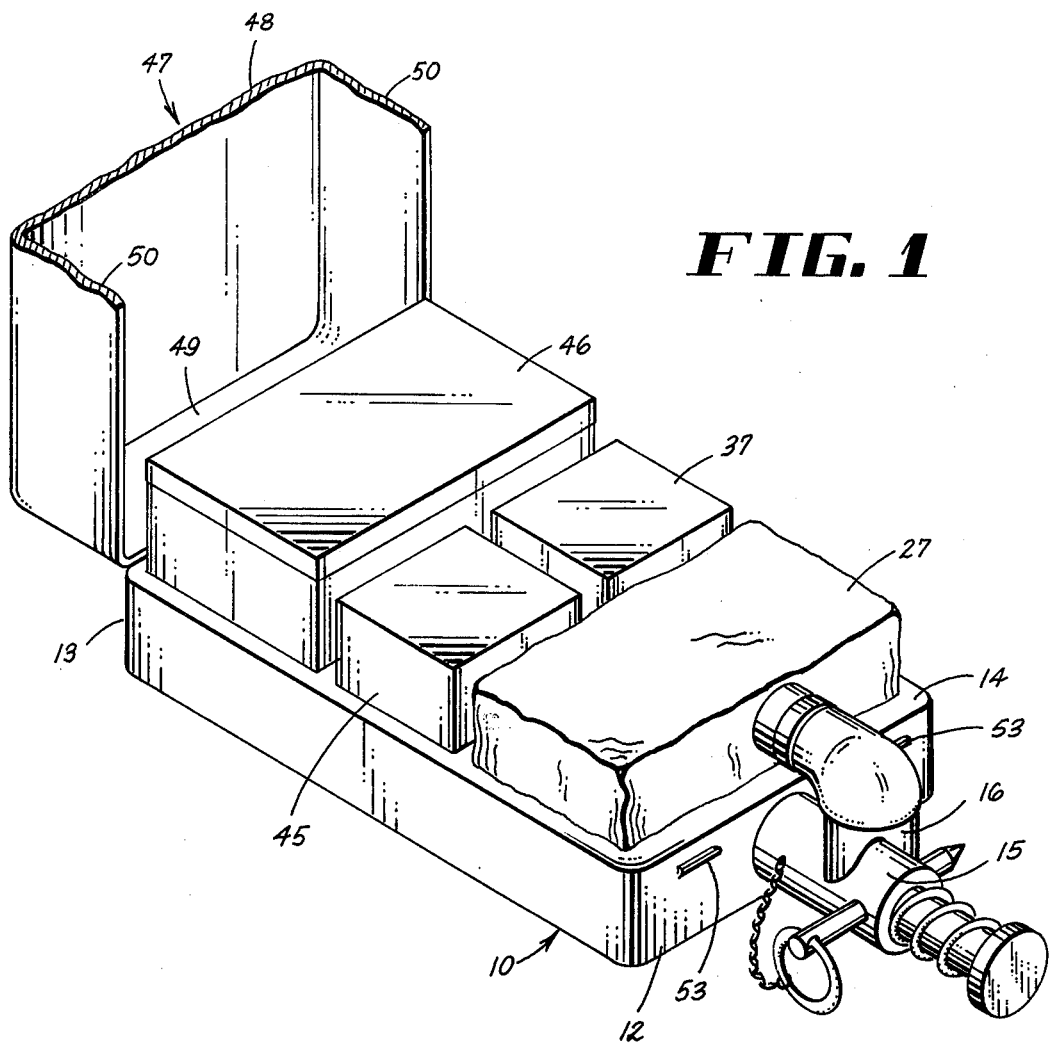
FIG. 1 is a perspective of a distress signal embodying the precepts of this invention with the cover being open and broken away.

Referring now to the drawings wherein like reference characters denote corresponding elements throughout the several views and first more particularly to FIG. 1, a gas-tight tank is referred to in its entirety by the reference character 10. Tank 10 comprises a bottom wall 11 (FIG. 2), end walls 12 and 13 and a top wall 14. Bottom 11 and top wall 14 are rectangular in shape thus, imparting a rectangular shape to tank 10.

Projecting from end wall 12 is a neck 15 having a lateral conduit extension 16 which communicates with the neck.

Figure 3:
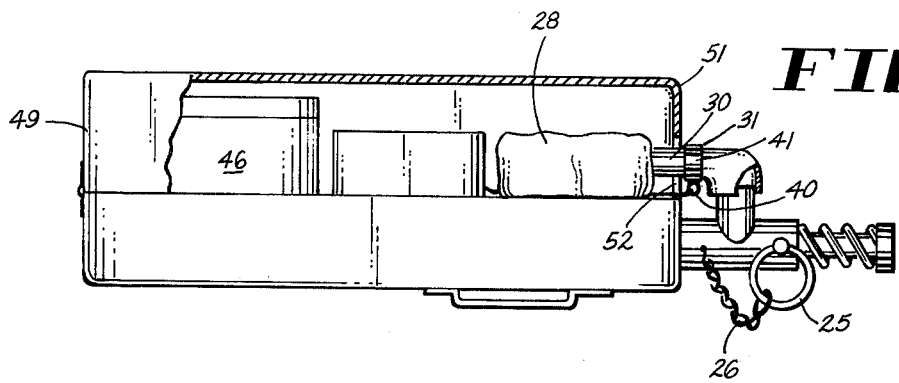
FIG. 3 is a side view with the cover being shown in closed position partially broken away and the top wall thereof shown in section.
Figure 4:
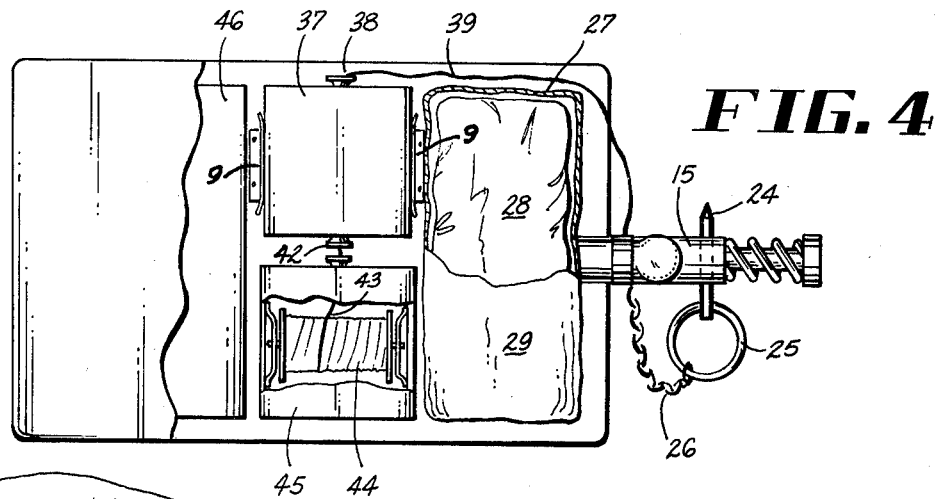
FIG. 4 is a top plan view of the unit with the cover broken away.
Figure 5:
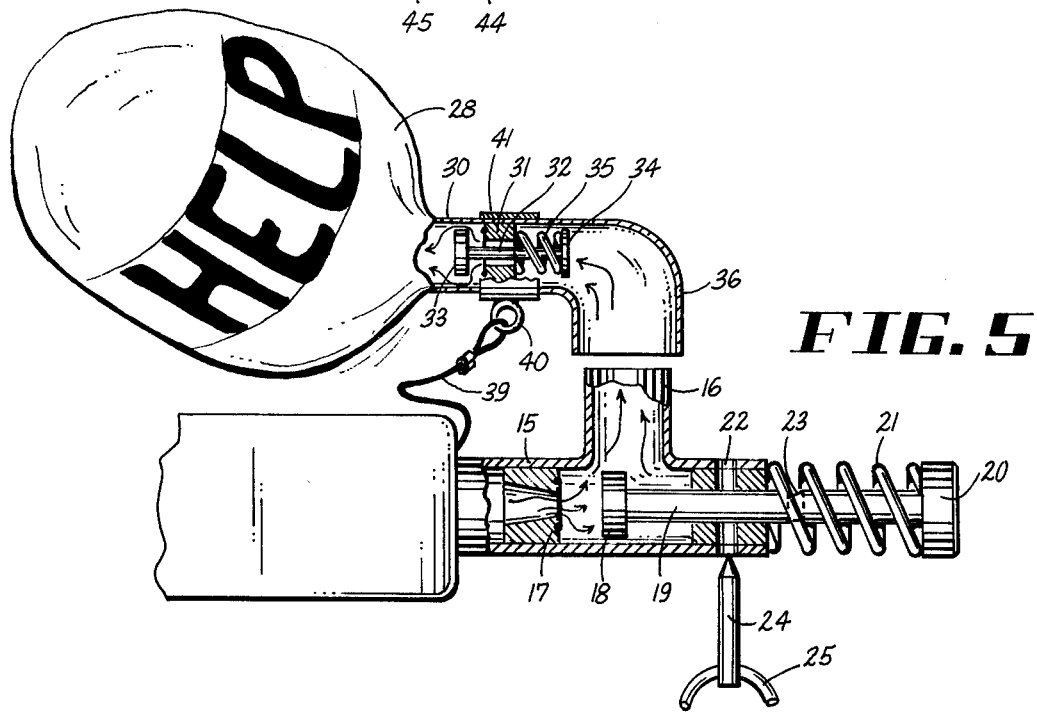
FIG. 5 is a detail taken on an enlarged scale illustrating an end portion of the tank and the balloon as partially inflated in elevation and the necks on the tank and balloon in section.

Referring now more particularly to FIG. 5, neck 15 is shown as having a valve seat 17 with which cooperates a valve disc 18. Extending from disc 18 is a valve stem 19 having a head 20 on its free end. An expansion coil spring 21 is disposed about stem 19 and is interposed between head 20 and the end of neck 15. Spring 21 biases valve disc 18 to the open position illustrated in FIG. 5. Neck 15 is formed with a pair of diametrically opposed openings 22 which align with a diametric passage 23 in stem 19. With disc 18 on seat 17 passage 23 aligns with openings 22 and a locking device including a lock pin 24 is passed through the aligned openings and passage to securely hold the disc 18 in closed position on seat 17 thus, preventing the flow of gas from tank 10. Lock pin 24 has a handle in the form of a loop 25 and upon reference to FIGS. 3 and 4 it will be noted that a chain 26 has one end secured to the loop 25 and the other end to neck 15. This chain 26 prevents loss or misplacement of lock pin 24.

Referring now more particularly to FIG. 4, which may be considered along with FIG. 1, a balloon package is designated generally at 27. It comprises a conventional balloon 28 of rubber or rubberized material commonly employed in the production of balloons and a casing 29 of aluminum foil which includes the balloon 27 when the latter is deflated and folded into a compact condition. Balloon 28 has a neck 30 which is shown more clearly in FIG. 5. Mounted in neck 30 is a one way check valve comprising the valve seat ring 31 presenting a central passage and through which passes a valve stem 32. A valve disk 33 is mounted on what might be called the inner end of valve stem 32 and engages seat ring 31 to prevent escape of gas from the balloon. Valve stem 32 has a head 34 at its other end and an expansion coil spring 35 is disposed about valve stem 32 and is interposed between seat ring 31 and head 34. Thus, spring 35 normally holds disc 33 in a closed position. However, the pressure of inflowing gas moves the disc 33 to open position.

The end of neck 30 is formed as an elbow providing the conduit section 36 which overlaps conduit extension 16 with a fairly snug fit. The overlapping of conduit section 36 and conduit extension 16 constitute a breakable connection.

Briefly describing the operation of the parts as set out above, it is further noted that upon pulling the lock pin 24 free of opening 22 and passage 23, valve disc 18 is moved to open position and gas flows through neck 15, conduit section 16, conduit section 36 and neck 30 into balloon 28. When this pressure of gas reaches a sufficient degree, aluminum foil casing 29 is ruptured and balloon 28 is inflated and rises into the position of FIG. 6. At this point it is well to note that the balloon may have a surface which is distinctly colored as by fluorescent paint and may have words such as the "HELP" depicted in FIG. 6, SOS, or any other comparable insignia printed thereon.

Figure 6:
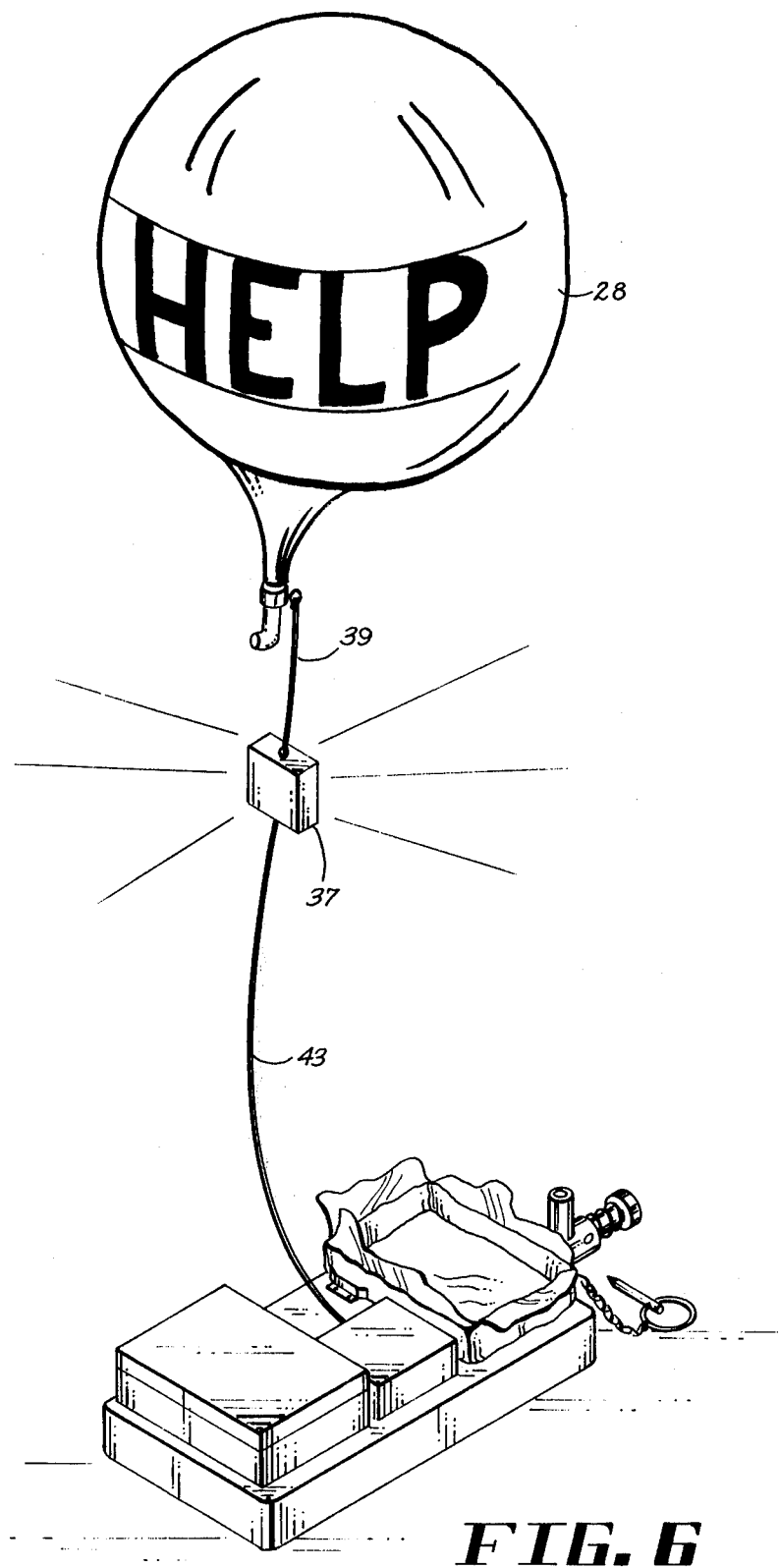
FIG. 6 is a perspective showing the signal in effective operation.

Referring now again to FIG. 4, which may be considered along with FIG. 1, a radio transmitter is shown at 37. Radio transmitters are well known and it is deemed unnecessary to describe the details thereof. As shown in FIG. 4, one end of transmitter 37 is shown as formed with a loop 38 to which one end of a cable 39 is connected. The other end of cable 39 is connected to neck 30 by loop 40 which is secured to a band 41. This cable 39 is of comparatively short extent whereby transmitter 37 is positioned closely adjacent to balloon 28 as shown in FIG. 6. Transmitter 37 is clamped against the upper wall 14 of tank 10 by releasable clamps 9. A trigger which activates transmitter 37 is illustrated somewhat diagramatically at 42 in FIG. 4. This trigger 42 activates transmitter 37 when the transmitter is pulled free of clamps 9. A nylon cord or tether 43 (FIG. 6) which will be a length in the order of 1,000 feet is connected to transmitter 37. This tether is taken up on reel 44 which is mounted in a reel casing 45.

A first aid kit is shown at 46. Without here setting forth in detail the contents of the first aid or survival kit 46, it is noted that it will contain the materials, elements and devices necessary to preserve the health and welfare of a person in the particular area over which he expects to travel. Thus, the materials desired for such a kit for use in Florida would be somewhat different from a kit desired for use in Alaska. A cover or lid is designated generally at 47. It comprises a top wall 48 conforming in shape substantially to the size of the bottom 11 and top 14 of tank 10. Depending from one end of top wall 48 is an end wall 49 the lower edge of which is hingedly connected to the upper edge of end wall 13 of tank 10. Depending from side edges of top wall 48 are side walls 50, which overlie and enclose balloon package 27, transmitter 37, reel casing 45, and survival kit 46. Cover 47 also includes another end wall 51 which is formed with a notch 52 which accommodates balloon neck 30. Wall 51 may also be formed with elements of a fastener which cooperate with the fastening elements 53 on the exterior tank wall 12, as shown in FIG. 1.

Figure 2:
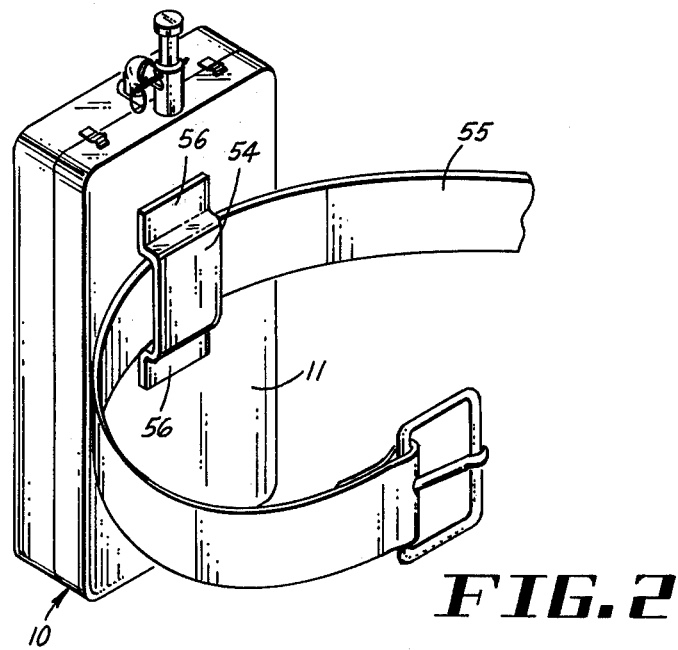
FIG. 2 is another perspective looking at the underside of the tank depicting how it is applied to a belt.

Referring now to FIG. 2, it will be noted that bottom wall 11 of tank 10 is shown as carrying a clip 54 which encircles a belt 55; a clip 54 may include end tabs 56 which are secured to wall 11 or end tab may be free thereof to provide what is, in effect, a spring clip. It is evident that with belt 55 encircling the torso of a person, the distress signal unit is securely anchored.

It is believed to be unnecessary to here give a detailed description of the complete manner of operating and using the subject distress signal because the several phases of the operation have been described above.

While a preferred specific embodiment of the invention is herein disclosed, it is to be clearly understood that the invention is not limited to the exact constructions, mechanisms, and devices illustrated and described because various modifications of these details may be provided in putting the invention into practice.

What is claimed is:

1. In apparatus for identifying the location of a person in distress:
   a. a gas-tight tank comprising rectangular top and bottom walls, side walls and end walls, and a lighter than air nonflammable gas in the tank,
   b. a neck protruding from one of said end walls having a conduit section communicating therewith,
   c. valve in said neck held in closed position by a locking device and spring forced to open position when said locking device is rendered ineffective,
   d. a balloon package comprising a collapsed balloon enclosed in a casing of metallic foil, said package being positioned on the top wall of said tank adjacent to the end wall having the neck protruding therefrom,
   e. said balloon having a neck with a one way check valve therein and a conduit section extending therefrom and communicating with the conduit section on the tank neck by way of a breakable connection,
   f. a radio transmitter resting on and releasably clamped to the top wall of said tank adjacent to said balloon package and includes a trigger, which activates the transmitter when it pulls free of said top wall,
   g. a cable having one end secured to the neck of said balloon and its other end to said transmitter,
   h. a reel secured to the top wall of said tank adjacent to said transmitter,
   i. a tether taken up on said reel and having one end anchored thereto and its other end secured to said transmitter, and
   j. a cover hinged to the upper edge of a tank wall and in closed position covering the elements on the top wall of said tank.

2. The apparatus of claim 1 together with a first aid survival kit on the top wall of said tank and enclosed by said cover.

3. The apparatus of claim 2 in which the cover comprises a top wall and side and end walls depending therefrom with one end wall being hinged to the tank and the other end wall being formed with a recess that receives the neck on the balloon when the cover is in closed position.

4. The apparatus of claim 1 in which the gas in the tank is helium.

5. The apparatus of claim 1 in which the tether is a nylon cord.

6. The apparatus of claim 1 together with a clip on the bottom wall of said tank and which is attached to an article of wearing apparel on the person of a user.

7. The apparatus of claim 1 in which the valve in the neck of the tank comprises a valve seat, a disc normally resting on said seat and mounted on one end of a valve stem with a head on the other end of said stem; and an expansion coil spring about said stem and interposed between said head and said tank neck, and in which said locking device comprises a locking pin which passes through diametrically aligned openings in said tank neck and a passage in said stem when the disc is seated on said seat.

8. The apparatus of claim 1 in which the breakable connection between the conduit sections take the form of a slidable overlap of said conduit sections.

* * * * *